US006836654B2

(12) United States Patent
Decotignie

(10) Patent No.: US 6,836,654 B2
(45) Date of Patent: Dec. 28, 2004

(54) ANTI-THEFT PROTECTION FOR A RADIOTELEPHONY DEVICE

(75) Inventor: Philippe Decotignie, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 509 days.

(21) Appl. No.: 09/739,507

(22) Filed: Dec. 18, 2000

(65) Prior Publication Data

US 2001/0016484 A1 Aug. 23, 2001

(30) Foreign Application Priority Data

Dec. 21, 1999 (FR) .............................. 99 16136

(51) Int. Cl.[7] .......................... H04M 1/00; H04M 3/00; H04M 1/66; H04B 1/06; H04B 1/38; H04Q 7/20
(52) U.S. Cl. ...................... 455/410; 455/411; 455/418; 455/425; 455/550.1; 455/558; 455/565
(58) Field of Search ................................ 455/410, 411, 455/412.1, 412.2, 418–419, 425, 550.1, 558, 26.1, 404.1, 557, 565–567; 380/264, 268, 273; 713/158, 502, 600, 601; 705/65, 66, 67

(56) References Cited

U.S. PATENT DOCUMENTS

| | | | | |
|---|---|---|---|---|
| 4,908,848 A | * | 3/1990 | Hanawa ...................... 455/565 |
| 4,945,556 A | * | 7/1990 | Namekawa ................. 455/565 |
| 5,204,663 A | * | 4/1993 | Lee ........................ 340/825.34 |
| 5,864,765 A | * | 1/1999 | Barvesten .................... 455/565 |
| 5,907,804 A | * | 5/1999 | Schroderus et al. ........ 455/411 |
| 5,913,175 A | * | 6/1999 | Pinault ....................... 455/558 |
| 5,978,670 A | * | 11/1999 | Casoli et al. ............... 455/411 |
| 6,095,416 A | * | 8/2000 | Grant et al. ................ 235/449 |
| 6,119,000 A | * | 9/2000 | Stephenson et al. ........ 455/432 |
| 6,125,283 A | * | 9/2000 | Kolev et al. ................ 455/552 |
| 6,141,563 A | * | 10/2000 | Miller et al. ................ 455/558 |
| 6,339,643 B1 | * | 1/2002 | Mastrocola et al. ... 379/433.06 |
| 6,370,400 B1 | * | 4/2002 | Decotignie et al. ......... 455/565 |
| 6,398,115 B2 | * | 6/2002 | Krause ....................... 235/492 |
| 6,490,463 B1 | * | 12/2002 | Portalier et al. ............ 455/557 |
| 6,542,731 B1 | * | 4/2003 | Alos .......................... 455/411 |
| 6,583,714 B1 | * | 6/2003 | Gabou et al. .............. 340/5.54 |

FOREIGN PATENT DOCUMENTS

GB 2287855 A 9/1995

* cited by examiner

*Primary Examiner*—William Trost
*Assistant Examiner*—Meless Zewdu
(74) *Attorney, Agent, or Firm*—Jack D. Slobod

(57) ABSTRACT

A mobile radiotelephony device intended for accommodating a linked user identification module offers protection against theft. The device prevents a normal operation of the device with an unlinked identification module, and permits the normal operation of the device with the linked identification module until such time the device has been inactive for a defined period of time. A debugging code can be supplied to the device subsequent to a detection of the defined period of time to again permit the normal operation of the device with linked identification module.

20 Claims, 2 Drawing Sheets

ANTI-THEFT PROTECTION FOR A RADIOTELEPHONY DEVICE

FIELD OF THE INVENTION

The invention relates to a mobile radiotelephony device intended for accommodating a user identification module, where the device has an established link to an identification module to thereby prevent a normal operation of the device when an identification module other than the linked identification module is mounted inside the device.

The invention also relates to a method of protecting such a device, and a computer program for implementing such a method.

The invention notably has applications in the field of portable radiotelephony. Portable radiotelephony devices are intended to accompany their users when they move around. It happens that these devices are lost or stolen.

PRIOR ART OF THE INVENTION

U.S. Pat. No. 5,913,175, published Jun. 15, 1999 describes a method of protecting a radiotelephone which permits to avoid that the lost or stolen telephone can be used by a third party with another user identification module. This method comprises establishing a link between the device and a specific user identification module and blocking the normal operation of the device when the user identification module that is placed inside the device is not the one that is linked to the device.

When the device is lost or stolen with the identification module to which it is linked, the user is to warn the operator so that the use of his identification module is blocked at network level.

This means that the device can be freely used until the identification module to which it is linked is blocked via the network. This may take a certain period of time.

SUMMARY OF THE INVENTION

It is notably an object of the invention to resolve this problem. For this purpose, a device in accordance with the invention (1) verifies a user identification module mounted inside the mobile radiotelephony device is linked to the mobile radiotelephony device, (2) detects a period of inactivity of the mobile radiotelephony device during a normal operation of the mobile radiotelepony device, wherein the normal operation includes a processing of all outgoing calls, and (3) prevents the normal operation of the mobile radiotelephony device in response to the verification of the user identification module and in response to the detection of the period of inactivity of the mobile radiotelephony device.

Thus, when the device falls into the hands of a third party together with the identification module to which it is linked, it has most probably been inactive for a period of time that is sufficiently long for its normal operation to be blocked (advantageously, the inactive time after which the blocking means are activated is of the order of several minutes). The device cannot thus be used without the deblocking code being supplied.

Thanks to the invention the lost or stolen device becomes totally unusable. A fraudulent person cannot send communications at the cost of the owner of the device. But neither can he use the device with another identification module. The theft of the device becomes totally useless. The invention thus forms a protection against theft.

In a particularly simple embodiment, the connecting means comprise reading means and storage means of a data stored in the identification module, and the test means compare the thus stored data with the data stored in the identification module which is places inside the device. The data stored is formed, for example, by the international identification number IMSI which is contained in the identification module (compare standards relating to the GSM radiotelephony systems). Thus, the identification module is automatically linked to the device without the intervention of the user, more particularly without the fact that a specific code has to be entered.

Advantageously the deblocking code, which is to be supplied to return to the normal operating mode, is formed by the pin code (Personal Identity Number) which is contained in the identification module (compare standards relating to the GSM radiotelephony systems). Thus the user need not store an additional code to ensure the protection of his device.

BRIEF DESCRIPTION OF THE DRAWINGS

These and other aspects of the invention are apparent from and will be elucidated, by way of non-limitative example, with reference to the embodiment(s) described hereinafter.

In the drawings.

DESCRIPTION OF A PREFERRED EMBODIMENT OF THE INVENTION

Figure 1:
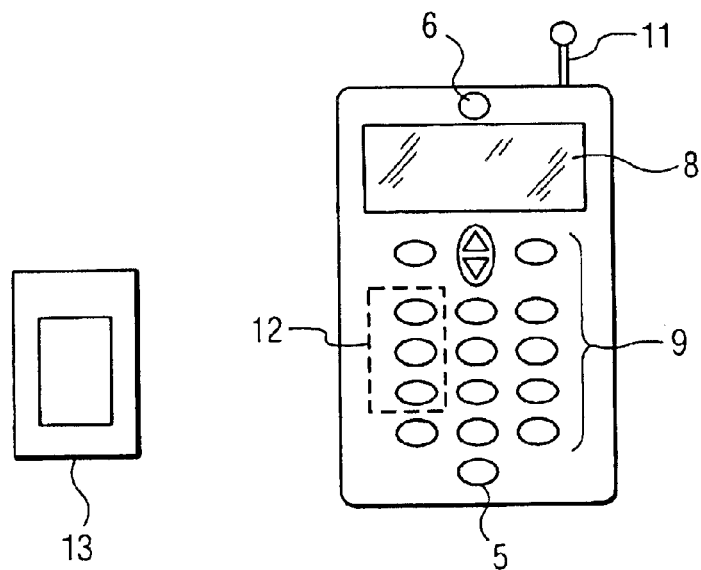
FIG. 1 represents a device in accordance with the invention.

In FIG. 1 is represented an electronic device in accordance with the invention. In the example described here this device is a portable radiotelephone of the type used in cellular systems. It notably comprises a microphone 5, a loudspeaker 6, a screen 8, a keypad 9 and an antenna 11. The device 1 also comprises a housing 12 intended for accommodating a user identification module 13. In the example of embodiment described here, this identification module 13 is a portable card of an integrated circuit in which information is stored, notably an international identification number currently called IMSI number, and a Personal Identification Number currently called PIN code.

Figure 2:
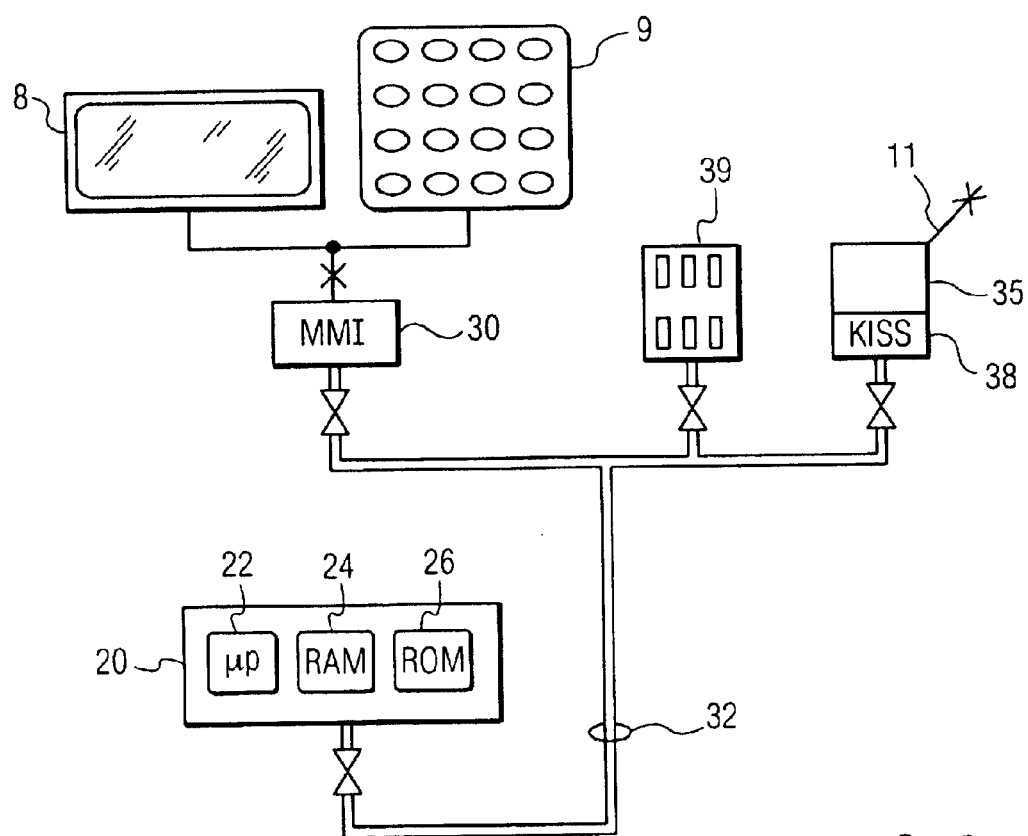
FIG. 2 represents an overall electric diagram of the device of FIG. 1.

FIG. 2 shows the overall electrical diagram of this device 1. The operation of the device 1 is, in essence, controlled by a microprocessor assembly 20 which comprises a microprocessor ("µP") 22 to which are associated a random access memory ("RAM") 24 and a read-only memory ("ROM") 26. This assembly is connected to a man-machine interface 30 via a common line 32. This man-machine interface 32 controls the screen 8 and the keypad 9. The common line 32 also connects the microprocessor assembly 20 to a transceiver assembly ("TX") 35 via an interface circuit 38. The transceiver assembly 35 is connected to the antenna 11. Finally, the common line 32 also connects the microprocessor assembly 20 to a card reader 39.

Figure 3:
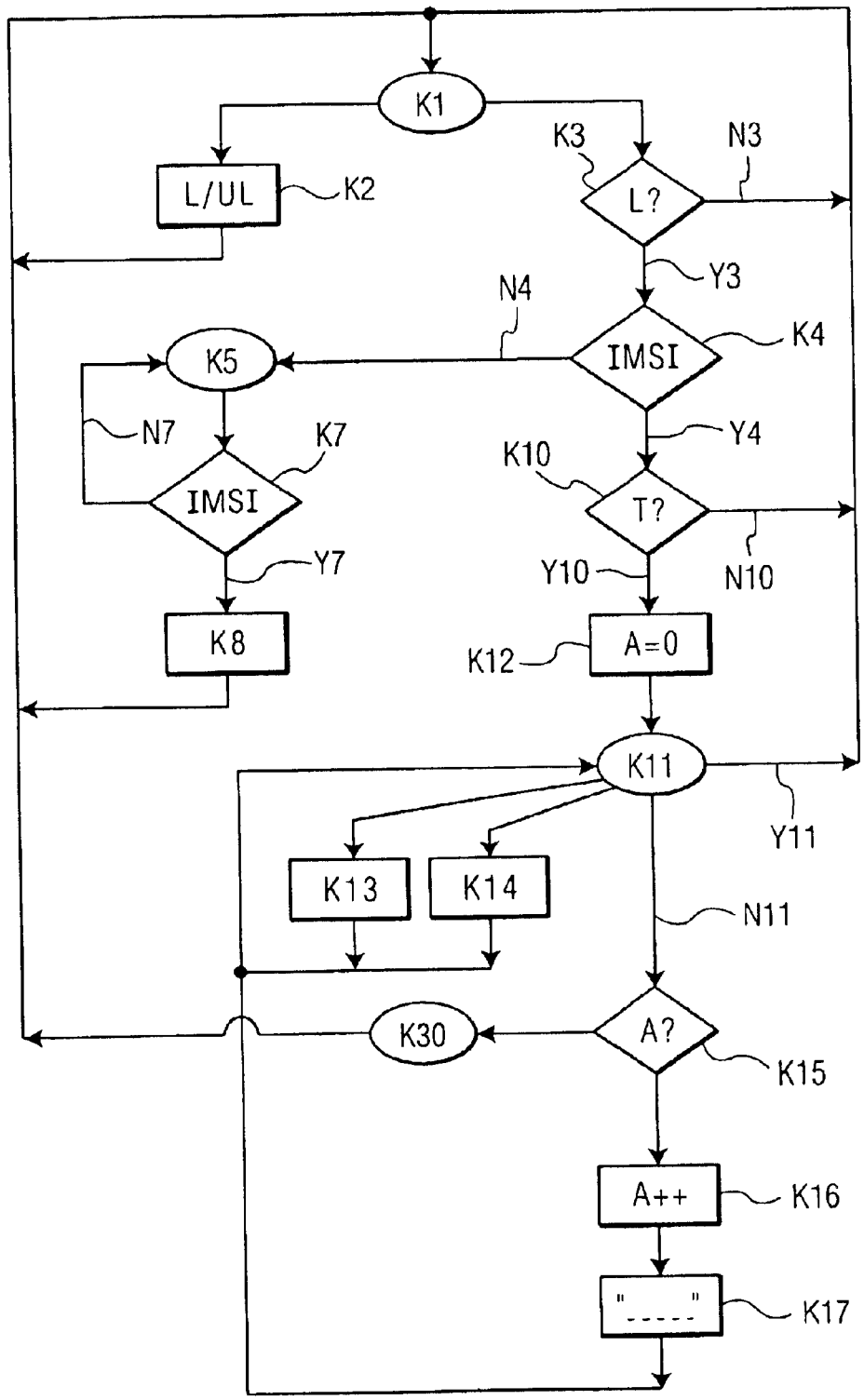
FIG. 3 represents a flow chart explaining the operation of the device of FIG. 1.

In FIG. 3 is represented a function flow chart of a device in accordance with the invention. This flow chart starts at box K1. In box K1 the device is in a state of availability, that is to say that the user has access to all the functions of the device. The user has the choice of either or not locking his device. This locking (L)/unlocking (UL) is done by accessing a configuration menu of the device. When the user locks his device (box K2), the identification module that is inside the device is automatically linked to the device. For this purpose, the device starts reading a data D1 in the identification module (for example, the international identification number IMSI) and he stores it in the random-access memory 24. Once locked, the device remains in the state of availability indicated in box K1. When the device is in the state of availability, one looks whether it is locked (box K3). If it is not locked (arrow N3), the device remains in the state of availability indicated in box K1. If it is locked (arrow Y3), one looks whether the identification module which is placed inside the device is the one that is linked to the device (box K4).

If the identification module, which is placed inside the device, is not the one that is linked to the device (arrow N4), the device goes to a first blocking state indicated in box K5. In this first blocking state, the device is disconnected from the network. Thus it can no longer receive an incoming call nor transmit an outgoing call (possibly with the exception of emergency numbers). In the blocking state K5, the screen shows a message inviting the user to insert the proper module into the device. And when the user inserts a new module, one looks whether this new identification module is the one that is connected to the device (box K7). If this is the case (arrow Y7), the device is reconnected to the network in accordance with the normal procedure (box K8) and then the device returns to the state of availability indicated in box K1. If not (arrow N7), the operation is resumed in box K5. The only way of leaving this first blocking state is thus to place the identification module that is linked to the device inside the device.

If the identification module that is placed inside the device is linked to the device (arrow Y4), one looks whether the device has remained in the state of availability for a certain period of time T of the order of several minutes, for example (box K10). If this is not the case (arrow N10), the device remains in the state of availability indicated in box K1. If this is the case (arrow Y10), the device passes on to a second blocking state indicated in box K11 by passing through an initialization step K12 which permits to initialize a variable A which represents the number of attempts made at supplying a deblocking code (for example, the Personal Identification Number) PIN.

In this second blocking state the device only processes incoming calls (box K13) and, possibly, the outgoing calls that correspond to emergency numbers (box K14). Once these calls have been processed, the device goes back to the second blocking state indicated in box K11. In the second blocking state K11 a message inviting the user to supply a deblocking code is displayed on the screen. If the code taken by the user is recognized (arrow Y11), the device goes back to the state of availability indicated in box K1. If it is not recognized (arrow N11), the value of the variable A is tested (box K15). If this value is lower than a certain figure (for example 3), the value of A is augmented by unity (box K16) and a message is displayed on the screen to indicate the user that the code is not valid (box K17). Then the device goes back to the second blocking state indicated in box K11. If the variable A is higher than or equal to said figure, the test of box K15 causes the total blocking of the device indicated in box K30. To leave this third blocking state it is necessary to contact the organization that provides the identification module. One is then again in the state of availability K1.

In another embodiment of the invention, when the user locks the telephone, the device asks for the user's name. The name given by the user is stored in the random access memory 24 of the device. When the identification module that is inside the device is not the one that is linked to the device, the device displays the name of the user before asking him to insert his identification module as indicated in box K5. The device also displays the name of the user before asking him to supply his personal code as indicated in box K11.

The embodiment that has just been described is particularly effective, because it provides two separate blocking modes depending on whether the identification module that is placed inside the device is either or not linked to the device. The first blocking mode is applied in the case where the device has been lost or stolen. The object is then to prevent the device being usable with another identification module. It thus advantageously blocks the incoming and outgoing calls at the same time. The second blocking mode is applied in the case where the identification module that is linked to the device is in its place inside the device and the device is in a state of availability. The object is to prevent a third party being able to send outgoing calls with this device if it is lost, stolen or left without attendance for some time. In that case, it is desirable for the user to be able to continue to directly receive his incoming calls.

In another embodiment the same blocking means are used as the identification module which is placed inside the device either or not linked to the device, for example, the second blocking means. In that case it is possible for receiving incoming calls intended for the identification module that is inside the device, even when this identification module placed inside the device is not linked to the device.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A mobile radiotelephony device, comprising:
   blocking means for preventing a normal operation of the mobile radiotelephony device, wherein the normal operation includes a processing of outgoing calls;
   timing means for activating the blocking means in response to the mobile radiotelephony device being inactive during the normal operation of the mobile radiotelephony device for a defined period of time subsequent to a mounting of a linked user identification module inside the mobile radiotelephony device; and
   deblocking means for permitting the normal operation of the mobile radiotelephony device in response to a supply of a deblocking code to the mobile radiotelephony device subsequent to the mounting of the linked user identification module inside the mobile radiotelephony device and subsequent to the defined period of time.

2. The mobile radiotelephony device of claim 1, wherein an activation of the blocking means prevents all transmission of outgoing calls.

3. The mobile radiotelephony device of claim 1, wherein an activation of the blocking means prevents all transmissions of non-emergency outgoing calls and permits all transmissions of emergency outgoing calls.

4. The mobile radiotelephony device of claim 1, further comprising:
   locking means for facilitating an activation of the block means by the timing means.

5. The mobile radiotelephony device of claim 1, further comprising:

connecting means for establishing a link between the mobile radiotelephony device and the linked user identification module.

6. The mobile radiotelephony device of claim 5, further comprising:

locking means for facilitating an establishment of the link between the mobile radiotelephony device and the linked user identification module by the connection means.

7. The mobile radiotelephony device of claim 1, wherein an international identification number stored on the linked user identification module is stored on the mobile radiotelephony device as data corresponding to a link between the mobile radiotelephony device and the linked user identification module.

8. The mobile radiotelephony device of claim 1, wherein a personal identification number stored on the linked user identification module is stored as the deblocking code on the mobile radiotelephony device.

9. The mobile radiotelephony device of claim 1, further comprising:

test means for activating the blocking means when any unlinked user identification module is mounted inside the mobile radiotelephony device.

10. A method of protecting a mobile radiotelephony device, the method comprising:

verfying a user identification module mounted inside the mobile radiotelephony device is linked to the mobile radiotelephony device;

detecting a period of inactivity of the mobile radiotelephony device during a normal operation of the mobile radiotelephony device, wherein the normal operation includes a processing of all outgoing calls;

preventing the normal operation of the mobile radiotelephony device in response to the verification of the linked user identification module and in response to the detection of the period of inactivity of the mobile radiotelephony device.

11. The method of claim 10, further comprising:

permitting the normal operation of the mobile radiotelephony device in response to the verification of the linked user identification module and in response to a supply of a deblocking code to the mobile radiotelephony device subsequent to the detection of the period of inactivity of the mobile radiotelephony device.

12. The method of claim 10, wherein the prevention of the normal operation of the mobile radiotelephony device prevents all transmissions of outgoing calls.

13. The method of claim 10, wherein the prevention of the normal operation of the mobile radiotelephony device prevents all transmissions of non-emergency outgoing calls and permits all transmissions of emergency outgoing calls.

14. The method claim 10, further comprising:

storing an international identification number stared on the linked user identification module onto the mobile radiotelephony device as data corresponding to a link between the mobile radiotelephony device and the linked user identification module.

15. The method claim 11, further comprising:

storing a personal identification number scored on the linked user identification module onto the mobile radiotelephony device as the debugging code.

16. The method of claim 10, further comprising:

preventing the normal operation of the mobile radiotelephony device in response to any unlinked user identification module being mounted inside the mobile radiotelephony device.

17. In a mobile radiotelephony device, a computer readable medium comprising:

computer readable code for verifying a user identification module mounted inside the mobile radiotelephony device is linked to the mobile radiotelephony device;

computer readable code for detecting a period of inactivity of the mobile radiotelephony device during a normal operation of the mobile radiotelephony device, wherein the normal operation includes a processing of all outgoing calls;

computer readable code for preventing the normal operation of the mobile radiotelephony device in response to the verification of the linked user identification module and in response to the detection of the period of inactivity of the mobile radiotelephony device.

18. The computer readable medium of claim 17, further comprising:

computer readable code for permitting the normal operation of the mobile radiotelephony device in response to the verification of the linked user identification module and in response to a supply of a deblocking code to the mobile radiotelephony device subsequent to the detection of the period of inactivity of the mobile radiotelephony device.

19. The computer readable medium of claim 18, further comprising:

storing a personal identification number stored on the linked user identification module onto the mobile radiotelephony device as the deblocking code.

20. The computer readable medium of claim 17, further comprising:

preventing the normal operation of the mobile radiotelephony device in response to any unlinked user identification module being mounted inside the mobile radiotelephony device.

* * * * *